United States Patent

[11] 3,565,137

| [72] | Inventor | Leonard U. Alsruhe<br>Towson, Md. |
|---|---|---|
| [21] | Appl. No. | 838,121 |
| [22] | Filed | July 1, 1969 |
| [45] | Patented | Feb. 23, 1971 |
| [73] | Assignee | The Black and Decker Manufacturing Company<br>Towson, Md. |

[54] BALL TRACK CARRIAGE CONSTRUCTION
10 Claims, 5 Drawing Figs.

[52] U.S. Cl. ............................................. 143/6
[51] Int. Cl. ............................................. B27b 5/20
[50] Field of Search ............................. 143/6.1, 47.4; 83/581

[56] References Cited
UNITED STATES PATENTS

| 2,312,356 | 3/1943 | Ocenasek | 143/6(.1) |
| 2,343,243 | 3/1944 | Roemer | 143/6(.1) |
| 2,933,111 | 4/1960 | Fish | 143/6(.1) |

FOREIGN PATENTS

| 1,118,972 | 3/1956 | France | 143/6(.1) |

*Primary Examiner*—Donald R. Schran
*Attorneys*—Leonard Bloom and Joseph R. Slotnik

ABSTRACT: A radial-arm saw which includes a base frame having an upstanding column pivoted thereon about a generally vertical axis. An arm rigid with the column extends over a worktable and has a carriage supported thereon for movement longitudinally thereof. A motor-driven saw suspended from the carriage is adapted to cut workpieces on the worktable.

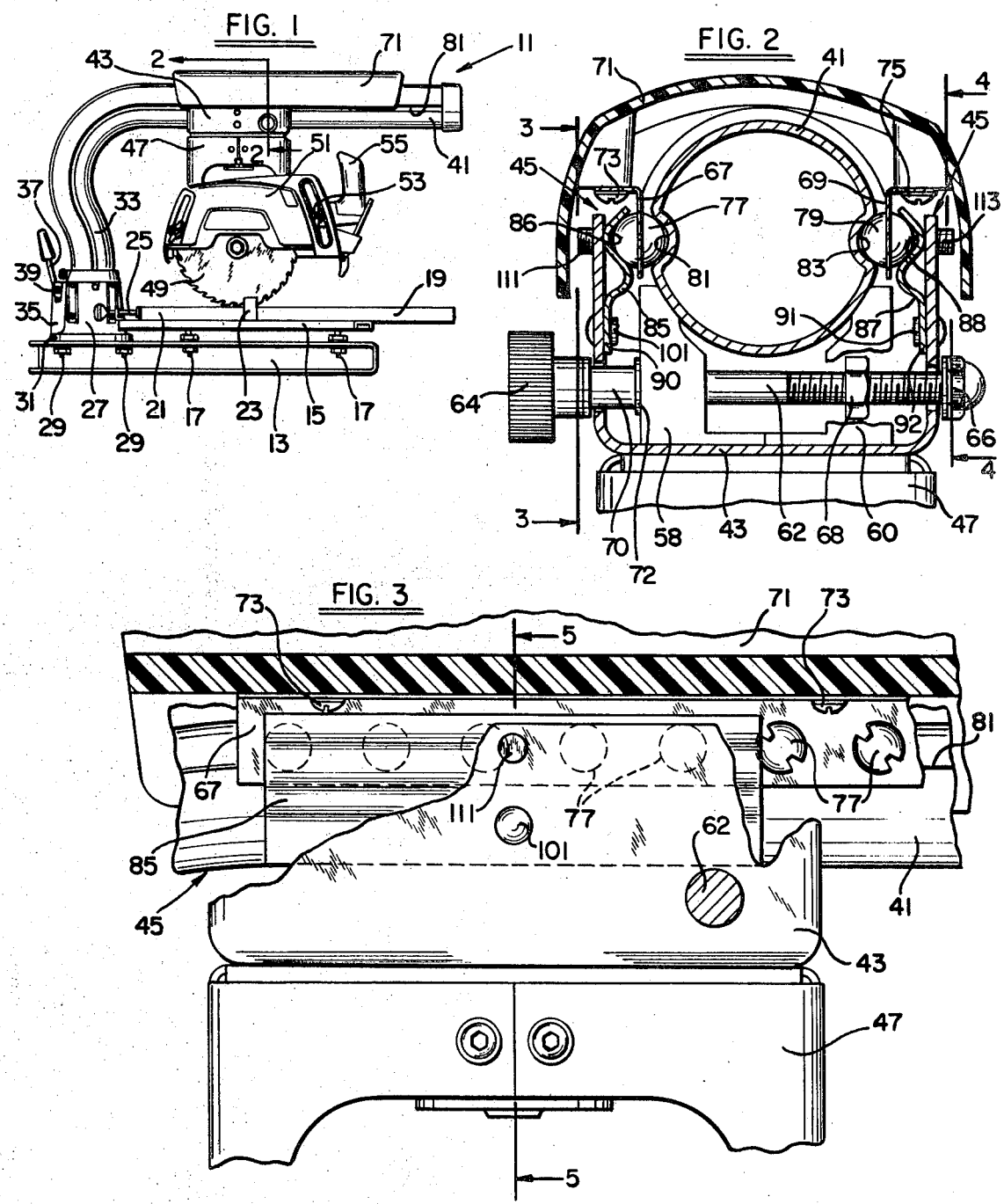

INVENTOR
LEONARD U. ALSRUHE
BY
ATTORNEY 3,565,137

BALL TRACK CARRIAGE CONSTRUCTION

SUMMARY OF THE INVENTION

The present invention is directed to a novel ball-track construction interconnecting the carriage and supporting arm of a traveling carriage-type device. The construction includes ball-track guides which are rapidly and easily adjustable for smooth and accurate carriage travel. Furthermore, this construction possesses the utmost in simplicity, and is correspondingly inexpensive, while at the same time being rugged and durable so that its performance is reliable and consistent.

Main objects of the present invention, therefore, are to provide a novel ball-track carriage construction for a traveling carriage device, which construction accommodates quick, easy and accurate adjustment to take up manufacturing tolerances, wear, and distortion in the parts and facilitates smooth, easy and accurate carriage travel throughout the life of the device.

Further objects of the present invention are to provide a novel construction of the above character which is simple and includes a minimum of parts.

Additional objects are to provide a novel construction of the above character which is relatively inexpensive to manufacture, rugged in construction, and reliable in performance.

Other objects and advantages will become more apparent from a consideration of the detailed description to follow taken in conjunction with the drawings annexed hereto.

BRIEF DESCRIPTION OF THE DRAWINGS

FIG. 1 is a side elevational view illustrating a radial-arm saw embodying the present invention;

FIG. 2 is an enlarged sectional view of FIG. 1 taken along the line 2—2 of thereof;

FIG. 3 is a sectional view of FIG. 2 taken along the line 3—3 thereof;

BROAD STATEMENT OF THE INVENTION

Figure 4:
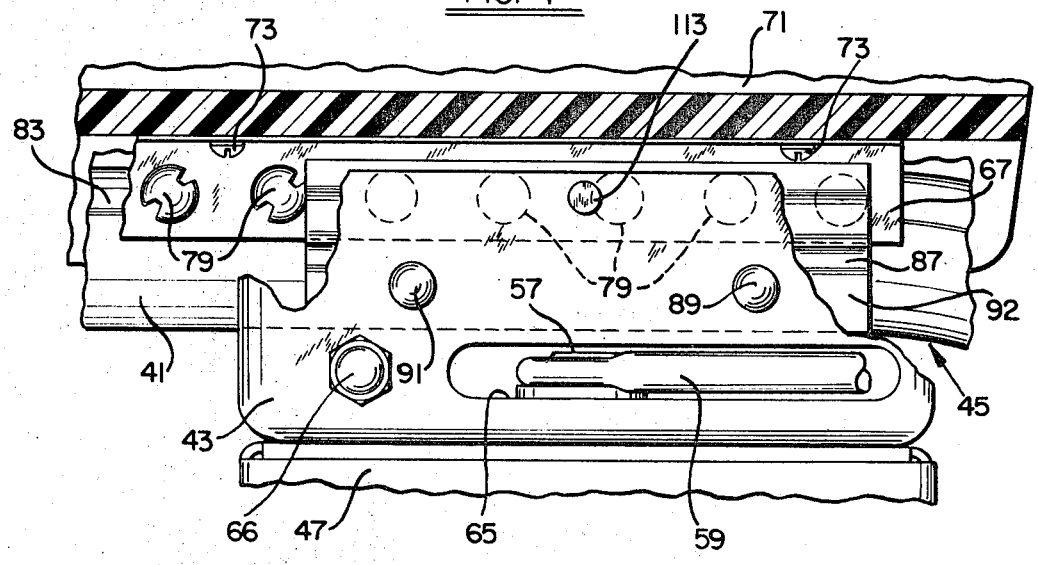
FIG. 4 is a sectional view of FIG. 2 taken along the line 4—4 thereof.
Figure 5:
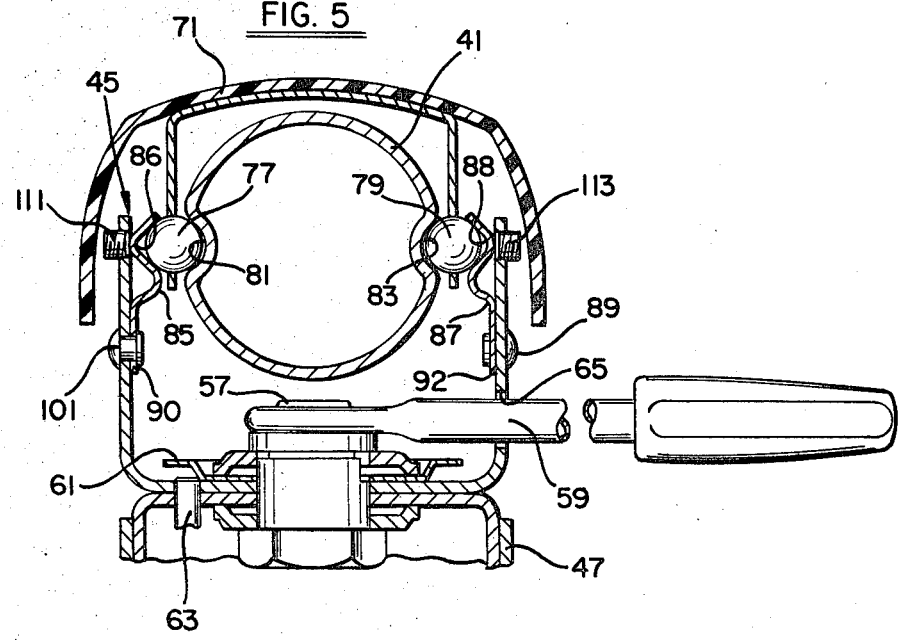
FIG. 5 is a sectional view of FIG. 3 taken along the line 5—5 thereof.

Broadly described, the present invention relates to a radial-arm saw including a frame, an arm supported by said frame, a saw carriage supported for movement along said arm, track means on opposite sides of said arm, retainer means on said carriage and in confronting relation to each said track means, ball means in rolling engagement with each said track means and its confronting retainer means, means for adjusting at least one of said retainer means relative to its confronting track means and said carriage, one of said retainer means being supported upon said carriage for pivotal movement relative to said carriage about an axis extending generally transversely of said arm and laterally of said carriage, whereby adjustment of said at least one retainer means acts through said ball means to align said pivoted retainer means relative to its confronting track means.

In another aspect, the present invention relates to a carriage-type device which includes a frame, an arm supported by said frame, a carriage support for movement along said arm; the improvement in said device which includes elongated recess means on opposite sides of said arm, a pair of retainer brackets on said carriage and in confronting relation to respective ones of said recess means, a carrier disposed between each confronting set of recess means and retainer brackets, a plurality of balls on each carrier and in rolling engagement with the associated recess means and brackets, means mounting a first one of said brackets for pivotal movement relative to said carriage about an axis extending transversely of said arm and laterally of said carriage, means for adjusting at least one of said brackets relative to its associated recess means and said carriage, whereby to facilitate accurate alignment of said brackets with their associated recess means, through pivotal movement of said first bracket relative to said carriage, and insure smooth travel of said carriage along said arm.

DETAILED DESCRIPTION

Referring now more specifically to the drawings, a radial-arm saw embodying the present invention is illustrated generally at 11 in FIG. 1 and is seen to include a pair of base frames 13 (only one of which is shown) each having a cleat 15 secured thereto by fasteners 17. A worktable includes a stationary portion 19 suitably secured to the cleats 15 and a removable portion 21 held against a work fence 23 by a plurality of clamps 25 (only one of which is shown).

The base frames 13 have an upstanding hollow hub 27 secured thereto by fasteners 29 which extend through the frames 13 and a base plate 31 formed integrally with the hub 27. The hub 27 is generally cylindrical in cross section and is split along a major portion of its length. An upstanding column 33 has its lower end received in and supported by the hub 27 and is adapted to be secured in place therein. To this end, the hub 27 has a pair of confronting, radial flanges 35 (only one of which is shown) formed adjacent the split ends and which are drawn together (or released) by means of a clamp lever 37. The clamp lever 37 extends through both flanges 35 and is threaded into a trapped nut 39. Thus, by turning the lever 37 in one direction, the flanges 35 are drawn together and the hub 27 tightly grips the column 33. Conversely, when the lever 37 is turned in the other direction, the hub 27 is loosened on the column 33 and allows it to be adjusted about a generally vertical axis.

The column 33 has a radial arm 41 rigid (here integral) therewith and which extends over the worktable 19, 21. A carriage 43 is supported for movement longitudinally of the arm 41 by a novel ball-track construction 45 and has a frame or yoke 47 suspended therefrom. A motor-powered saw, which includes a rotary saw blade 49 and a saw guard 51, is suspended from the yoke 47 and is adapted to be secured in selected vertically adjusted positions relative thereto by means of a wing nut 53. This, in turn, provides for ready adjustment of the depth of cut performed by the saw blade 49 on a workpiece situated on the worktable. A handle 55 rigid with the yoke 47 allows the operator to manipulate the yoke 47 and carriage 43 along the arm 41.

The yoke 47 is adapted to be pivoted or swiveled about a generally vertical axis relative to the carriage 43 to accommodate both "crosscutting" and "ripping." To this end, a threaded fastener 57 extends upwardly through adjacent faces of the yoke 47 and carriage 43 and has a locking lever 59 threaded thereon. The fastener 57 is prevented from turning by a locking washer 61 keyed thereto and fixed to the carriage 43 by a screw (not shown). The lever 59 extends through an elongated slot 65 in the carriage 43. Thus, when the lever 59 is turned in one direction, the yoke 47 is locked to the carriage 43 while turning the lever 59 in the opposite direction allows the yoke 47 to be swiveled or pivoted. Preferably, detent means 63 is provided to help position and releasably hold the yoke 47 in the "crosscutting" and "ripping" positions relative to the carriage 43.

During "crosscutting," it is necessary that the carriage 43 be free to travel along the arm 41. However, during ripping, the carriage 43 is locked to the arm 41 and does not move. To this end, the carriage 43 has a pair of gibs 58, 60 disposed therein (see FIG. 2). A carriage bolt 62 extends through the carriage 43 and is threaded through a nut 68 trapped in the gib 60. The carriage bolt 62 has an enlarged knob 64 fixed to its head end and an acorn nut 66 threaded on the other end. A spacer 70 and a washer 72 are trapped between the knobs 64 and the gib 58. Thus, by turning the knob 64 in one direction the gibs 58, 60 are drawn together and clamp against the arm 41 thereby locking the carriage 43 in place. When the knob 64 is turned in the opposite direction, the gibs 58, 60 are released from the arm 41 and the carriage 43 is free to travel along the arm 41.

It will be appreciated that it is necessary to provide and maintain accurate positioning and travel of the carriage 43 relative to the arm 41 in order that accurate cutting can be performed by the saw blade 49. To this end, the ball-track construction 45 comprises a pair of generally L-shaped ball carriers 67, 69 secured to a shroud 71 by screws 73, 75, respectively. Each carrier 67, 69 has a set of balls 77, 79 rotatably supported therein in a conventional manner, and these balls 77, 79 are adapted to ride in elongated tracks or grooves 81, 83, respectively, formed in opposite sides of the arm 41. The carriage 43 has a pair of generally S-shaped guide brackets 85, 87 secured thereon at opposite sides thereof. The brackets 85, 87 have tracks or recesses 86, 88, respectively, in general confronting relation to the tracks 81, 83. A straight portion 92 on the brackets 87 is securely fixed to the carriage 43 by a pair of rivets 89, 91. The straight portion 90 of the bracket 82 is mounted for pivotal movement on the carriage 43 by a single rivet 101.

At least one and preferably both of the track portions 86, 88 of the guide brackets 85, 87 is adjustable relative to the confronting tracks 81, 83, respectively. As shown, setscrews 111, 113 are threaded into opposite sides of the carriage 43 and engage the guide brackets 85, 87, respectively. Thus, these brackets 85, 87 may be adjusted relative to the carriage 43 and the tracks 81, 83 in the arm 41 to take up slack (and ensuing wear) of the parts and insure smooth movement of the carriage 43 along the arm 41.

In addition, it will be appreciated that when the guide brackets 85, 87 are so adjusted, the reaction forces on the guide brackets 85, 87 and the carriage 43 insures proper alignment of the track portions 86, 88 of the brackets 85, 87, and the brackets 81, 83. Thus, if any misalignment exists, the forces acting through the parts cause the bracket 85 to pivot on the carriage 43 about the rivet 101 so that the brackets 85, 87 are aligned with the tracks 81, 83 for smooth and accurate travel and positioning of the carriage (and saw) along the arm 41.

By the foregoing, there has been disclosed an improved ball-track carriage construction calculated to fulfill the inventive objects hereinabove set forth, and while a preferred embodiment of the invention has been illustrated and described in detail, various additions, substitutions, modifications and omissions may be made thereto without departing from the spirit of the invention as encompassed by the appended claims.

I claim:

1. A radial-arm saw including a frame, an arm supported by said frame, a saw carriage supported from movement along said arm, track means on opposite sides of said arm, retainer means on said carriage and in confronting relation to each said track means, ball means in rolling engagement with each said track means and its confronting retainer means, means for adjusting at least one of said retainer means relative to its confronting track means and said carriage, one of said retainer means being supported upon said carriage for pivotal movement relative to said carriage about an axis extending generally transversely of said arm and laterally of said carriage, whereby adjustment of said at least one retainer means acts through said ball means to align said pivoted retainer means relative to its confronting track means.

2. In a carriage-type device which includes a frame, an arm supported by said frame, a carriage supported for movement along said arm; the improvement in said device which includes elongated recess means on opposite sides of said arm, a pair of retainer brackets on said carriage and in confronting relation to respective ones of said recess means, a carrier disposed between each confronting set of recess means and retainer brackets, a plurality of balls on each carrier and in rolling engagement with the associated recess means and brackets, means mounting a first one of said brackets for pivotal movement relative to said carriage about an axis extending transversely of said arm and laterally of said carriage, means for adjusting at least one of said brackets relative to its associated recess means and said carriage, whereby to facilitate accurate alignment of said brackets with their associated recess means, through pivotal movement of said first bracket relative to said carriage, and insure smooth travel of said carriage along said arm.

3. A construction as defined in claim 1 wherein said track means includes elongated grooves formed in opposite sides of said arm.

4. A construction as defined in claim 1 wherein said at least one retainer means includes means forming an elongated track, said adjusting means being engageable with said track forming means.

5. A construction as defined in claim 4 wherein said at least one retainer means includes a base portion attached to said carriage, said track forming means being deflectable relative to said base portion by said adjusting means.

6. A construction as defined in claim 1 wherein each of said retainer means includes means forming an elongated track confronting respective ones of the track means in said arm and a base portion, means pivotally connecting the base portion of said one retainer means to said carriage, and means rigidly securing the base portion of the other of said retainer means to said carriage.

7. A construction as defined in claim 1 wherein said carriage is generally U-shaped in cross section and envelopes said arm, said retainer means including a retainer member mounted on each side of said carriage, and means on said carriage adapted to adjust each of said retainers relative to said arm.

8. A construction as defined in claim 2 which includes means rigidly securing the second of said brackets to said carriage.

9. A construction as defined in claim 2 wherein said retainer brackets each includes a base portion mounted on said carriage and a curved portion defining recesses disposed in spaced confronting relation to respective ones of the recess means on said arm, the base portion of said first bracket being pivoted to said carriage, means rigidly fixing the base portion of the second bracket to said carriage, said adjusting means being adapted to deflect the curved portion of said at least one bracket relative to said carriage and said arm.

10. A construction as defined in claim 9 which includes means for adjusting both of said bracket curved portions relative to said carriage and said arm.